Figure 1:
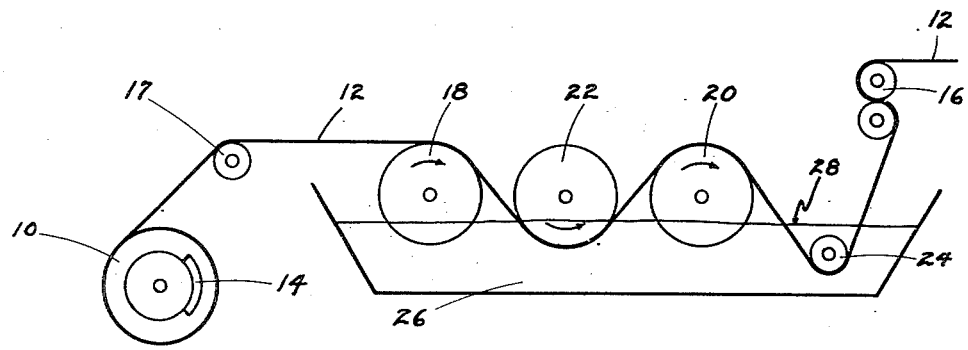

Patented Aug. 2, 1949

2,477,604

UNITED STATES PATENT OFFICE 2,477,604

MACHINE FOR IMPREGNATING WEBS

William E. Holland and Alexander J. Stanley, New Brunswick, and James A. Chesnut, Highland Park, N. J., assignors to Industrial Tape Corporation, a corporation of New Jersey Application January 11, 1945, Serial No. 572,406

4 Claims. (Cl. 91—31)

This invention relates to the impregnation or internal bonding of fibrous webs, for example, paper. It is particularly useful in making the backing or support in pressure-sensitive, normally tacky adhesive tape, but it is applicable in other fields as well.

Paper adhesive tapes and sheets are extensively used in industrial operations, in masking for spray painting, as temporary protective coatings for highly finished surfaces, and in many other applications. This tape is made by spreading a normally tacky, pressure-sensitive adhesive mass on an impregnated paper backing. The backing is impregnated in order to render the paper waterproof and resistant to lacquer solvents and, importantly, to bond the paper internally to prevent splitting. The tape is customarily prepared and sold in rolls, and obviously one of the necessary properties of the tape is adaptability to be unrolled for use. Unless paper-backed tapes are bonded to unify the paper layer, when an attempt is made to unroll the tape, the bond of the adhesive mass holding successive layers of the roll together is frequently stronger than the paper itself, so that the paper often splits into layers (variously called laminating or delaminating). This splitting leaves the adhesive mass stuck to the back of the tape when the tape is unrolled and renders the tape useless. Such paper is therefore customarily impregnated with one of a variety of bonding and solvent-resisting impregnants, for example a mixture of rubber and rosin dissolved in a suitable solvent which does not impair the strength of the paper when wet with the solvent, e. g. benzene.

Attempts to impregnate or bond paper backing by dipping in a bonding liquid have not been successful because the bonding liquid is applied simultaneously to both faces of the paper web and traps air in the fibers of the paper between two films of bonding material. Such entrapped air bubbles prevent a through-and-through bond, leaving unbonded areas which are particularly apt to split when the tape is stripped from the roll. Consequently in the application of the bonding material it has been found necessary to apply the bonding liquid to one side only of the paper, letting the liquid soak through the paper to the opposite face and displace any air entrapped in the fibers of the paper. This has been done by floating a strip of paper on a bath of the bonding liquid, and after the liquid has soaked through the paper and displaced the air, finally dipping the paper in the bath. The tape is manufactured in continuous strips and this requires a very long impregnating tank over which the strips of paper are passed. This takes up a large amount of factory space and the process is slow.

Our invention is concerned with improving the process and apparatus for applying the bonding liquid to the paper, and among its objects are the provision of a rapid and more effective bonding process and the provision of apparatus for carrying out the process in a minimum of space. It is also an object to provide simple and economical means for positively pressing the bonding liquid into the paper progressively from one surface to the opposite surface.

Figure 2:
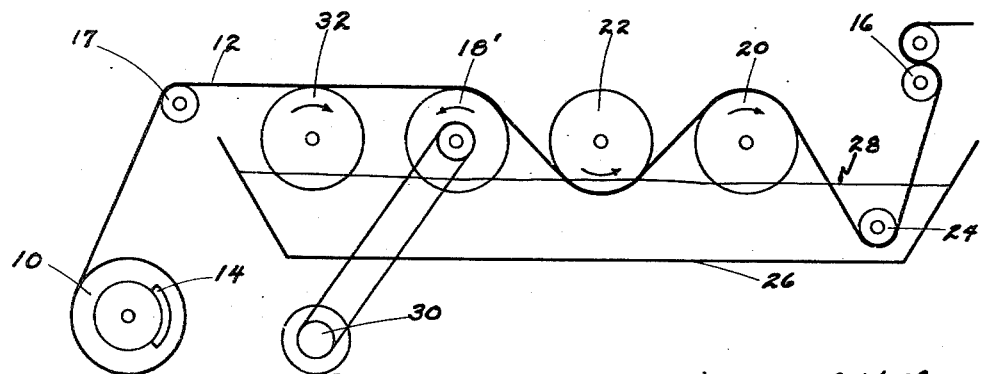

In the accompanying drawings:

Fig. 1 is a diagrammatic representation of one form of apparatus for practicing the invention, and Fig. 2 is a similar representation of a modified form.

Referring to the drawings, a roll 10 of paper web 12 is mounted on any suitable unwinding apparatus which includes means for properly tensioning the paper as it is unwound, such as the adjustable friction brake 14. The paper is positively unwound by a pair of feed rolls 16 at the other end of the apparatus, and is passed over a guide roll 17 and a pair of impregnating rolls 18 and 20. Between rolls 18 and 20 is any suitable means 22 for guiding the web around a substantial arc (e. g. 35° to 90°) of the circumference of the rolls so that the web is in contact with a large area of each roll. Preferably this holding means 22 is a roll like rolls 18 and 20. After leaving the last impregnating roll 20, the web passes under a guide roll 24 placed below the level of the roll 20 which holds it in contact with a larger area of this impregnating roll. As the paper is fed by the rolls 16, the tension imparted by the brake 14 holds the web firmly against the surfaces of the impregnating rolls.

Any suitable means is provided to supply bonding material to the impregnating rolls. Conveniently this may be a tank 26 filled to the level 28 with the bonding liquid into which the rolls dip. The roll 18 thus coated with a film of bonding liquid applies this film to the under side of the paper and positively presses it into the paper due to the tension of the strip which holds it firmly against the roll. During this pressing, the upper surface of the paper is unobstructed and free to the atmosphere so that air can escape from the interstices of the fibers, being displaced from below by the bonding liquid. Next the strip is dipped into the bath by the roll 22 which again applies bonding liquid to the under side only, access to the top being prevented by contact between the roll 22 and the paper under tension, the liquid in the tank being below the level at which the web makes contact or leaves contact with the roll.

Next the paper passes up over the roll 20 which again presses into the paper from below the additional liquid which has been applied by dipping the paper. By this time the air has been expelled from the web, which can now be dipped into the bath for thorough impregnation without danger of entrapping air. Therefore the web is passed into the bath and under guide roll 24, whence it goes to the feed rolls 16, which also act as squeeze rolls to remove excess bonding liquid. The squeeze rolls are located above the tank to catch any excess dripping from the rolls.

The rolls 18, 20, 22 may be mounted in free bearings to be rotated by the drag of the paper web, or they may be positively driven at any suitable speeds which will maintain the proper tension of the paper. We have found that it accelerates the impregnation to drive one or both of the rolls 18 and 20 at a speed different from that of the web to provide a wiping action between the roll and the web.

We have found it particularly effective in wiping to drive the roll 18 in the opposite direction to the travel of the paper as shown in Fig. 2. The roll 18' corresponding to 18 in Fig. 1 is rotated by any suitable means, represented by the motor drive 30. In this arrangement it is desirable to provide a preliminary applying roll 32 which may be rotated by the drag of the paper but is preferably positively driven at substantially the speed of the paper to apply liquid to the paper before the paper reaches the wiping roll 18'. Without the roll 32 the wiping roll would have to be driven at excessive speed relative to the paper in order to be certain to carry impregnant up to the paper (against its movement) before the paper moved off the roll. This excessive speed would be apt to cause excessive tension and tear the paper.

After leaving the squeeze rolls 16 the paper passes through any suitable drier, not shown, to remove the solvent and leave the bonding material in the paper, as is known in the art.

It has been found in actual production that our invention impregnates paper at speeds more than twice the best speed heretofore known in the art, and in addition saves about 90% of the floor space required by apparatus impregnating by the flotation process.

We claim as our invention:

1. Apparatus for internally bonding fibrous webs comprising in combination a container for bonding liquid, a series of cylindrical rolls each having its cylindrical surface disposed partly above and partly beneath the liquid, a web passing over the first roll above the liquid and having its lower face in contact therewith and around and in contact with the second roll below the liquid, the lines of engagement and disengagement between the web and the second roll being above the liquid to maintain the upper face of the web out of contact with the liquid, the web passing around a substantial arc of the surface of the third roll above the liquid, and means for drawing the web continuously over the rolls, the rolls being continuously rotated in the liquid, the web in contact with the first and third rolls having its upper surface unobstructed and exposed to the atmosphere.

2. Apparatus for internally bonding fibrous webs comprising in combination a cylindrical roll, means for holding a fibrous web under tension and feeding the web over the roll, means for guiding the web with one surface in contact with a substantial arc of the circumference of the roll, the other surface of the web being unobstructed and exposed to the atmosphere where the web is in contact with the roll, means for applying bonding liquid to the first surface of the web before it reaches the roll, and means moving with respect to the web for wiping the liquid over said surface before the web reaches the roll.

3. Apparatus for internally bonding fibrous webs comprising in combination a container for bonding liquid, a series of cylindrical rolls each having its cylindrical surface disposed partly above and partly beneath the liquid, a web passing over the first roll above the liquid and having its lower face in contact therewith and around and in contact with the second roll below the liquid, the lines of engagement and disengagement between the web and the second roll being above the liquid to maintain the upper face of the web out of contact with the liquid, the web passing around a substantial arc of the surface of the third roll above the liquid, means for wiping the liquid over the lower surface of the web between the first and second mentioned rolls, and means for drawing the web continuously over the rolls and wiping means, the rolls being continuously rotated in the liquid, the web in contact with the first and third rolls having its upper surface unobstructed and exposed to the atmosphere.

4. Apparatus for internally bonding fibrous webs comprising in combination a container for bonding liquid, a series of cylindrical rolls each having its cylindrical surface disposed partly above and partly beneath the liquid, a web passing over the first roll above the liquid and having its lower face in contact therewith and around and in contact with the second roll below the liquid, the lines of engagement and disengagement between the web and the second roll being above the liquid to maintain the upper face of the web out of contact with the liquid, the web passing around a substantial arc of the surface of the third roll above the liquid, a fourth roll for wiping the liquid over the lower surface of the web between the first and second mentioned rolls, said fourth roll rotating at a different peripheral speed from the linear speed of the web, and means for drawing the web continuously over the rolls, the first, second and third rolls being continuously rotated in the liquid, the web in contact with the first and third rolls having its upper surface unobstructed and exposed to the atmosphere.

WILLIAM E. HOLLAND.
ALEXANDER J. STANLEY.
JAMES A. CHESNUT.

REFERENCES CITED

The following references are of record in the file of this patent:

UNITED STATES PATENTS

| Number | Name | Date |
|---|---|---|
| 146,240 | Field | Jan. 6, 1874 |
| 1,195,310 | White et al. | Aug. 22, 1916 |
| 1,240,154 | Sanburn | Sept. 11, 1917 |
| 1,505,694 | Bentel | Aug. 19, 1924 |
| 1,636,750 | Miller | July 26, 1927 |
| 1,854,192 | Holcomb | Apr. 19, 1932 |